United States Patent [19]

Hershkowitz

[11] 3,749,016
[45] July 31, 1973

[54] FLEXIBLE HOLLOW SPHERES

[75] Inventor: Joseph Hershkowitz, West Caldwell, N.J.

[73] Assignee: The United States of America as represented by the Secretary of the Air Force, Washington, D.C.

[22] Filed: Dec. 24, 1968

[21] Appl. No.: 786,781

[52] U.S. Cl.................. 102/1 R, 102/92.1, 244/1 SS
[51] Int. Cl............................................. F42b 13/00
[58] Field of Search...................... 102/38, 92.1, 42; 244/1 SS; 343/18, 915

[56] References Cited
UNITED STATES PATENTS

| | | | |
|---|---|---|---|
| 3,165,751 | 1/1965 | Clark | 343/915 |
| 3,204,239 | 8/1965 | Young | 343/18 |
| 3,290,681 | 12/1966 | Beteille | 343/18 |
| 3,400,660 | 7/1968 | Halter | 102/42 C |

*Primary Examiner*—Samuel W. Engle
*Attorney*—Harry A. Herbert, Jr. and Charles H. Wagner

[57] ABSTRACT

Lethal hollow spheres for destroying enemy targets in outer space by high velocity impact. The hollow spheres are formed of resilient rubber or other resilient material which is highly impregnated with metallic particles. The highly metallic impregnated resilient hollow spheres are flattened and partially evacuated and sealed so that each contain a small predetermined volume of gas or air trapped therein at, or substantially at, normal outside atmospheric pressure, for instance at ground level to retain the hollow spheres in their flattened condition by the outside atmospheric pressure, so that they occupy less space and a greater number of the flattened spheres can be packed in a delivery container, such as a rocket, or shell, for subsequent projection toward a selected target in rarefied air, or in the absence of surrounding atmosphere. As the spheres are projected through space or rarefield are toward a target or satellite the relative increase in pressure of the expanding gas or air trapped in the spheres, because of reduction or lack of outside surrounding atmospheric pressures, cause the flattened hollow spheres to expand outwardly to their initial full spherical shape, when discharged from their delivery container for lethal impact with the selected target or satellite in space.

10 Claims, 11 Drawing Figures

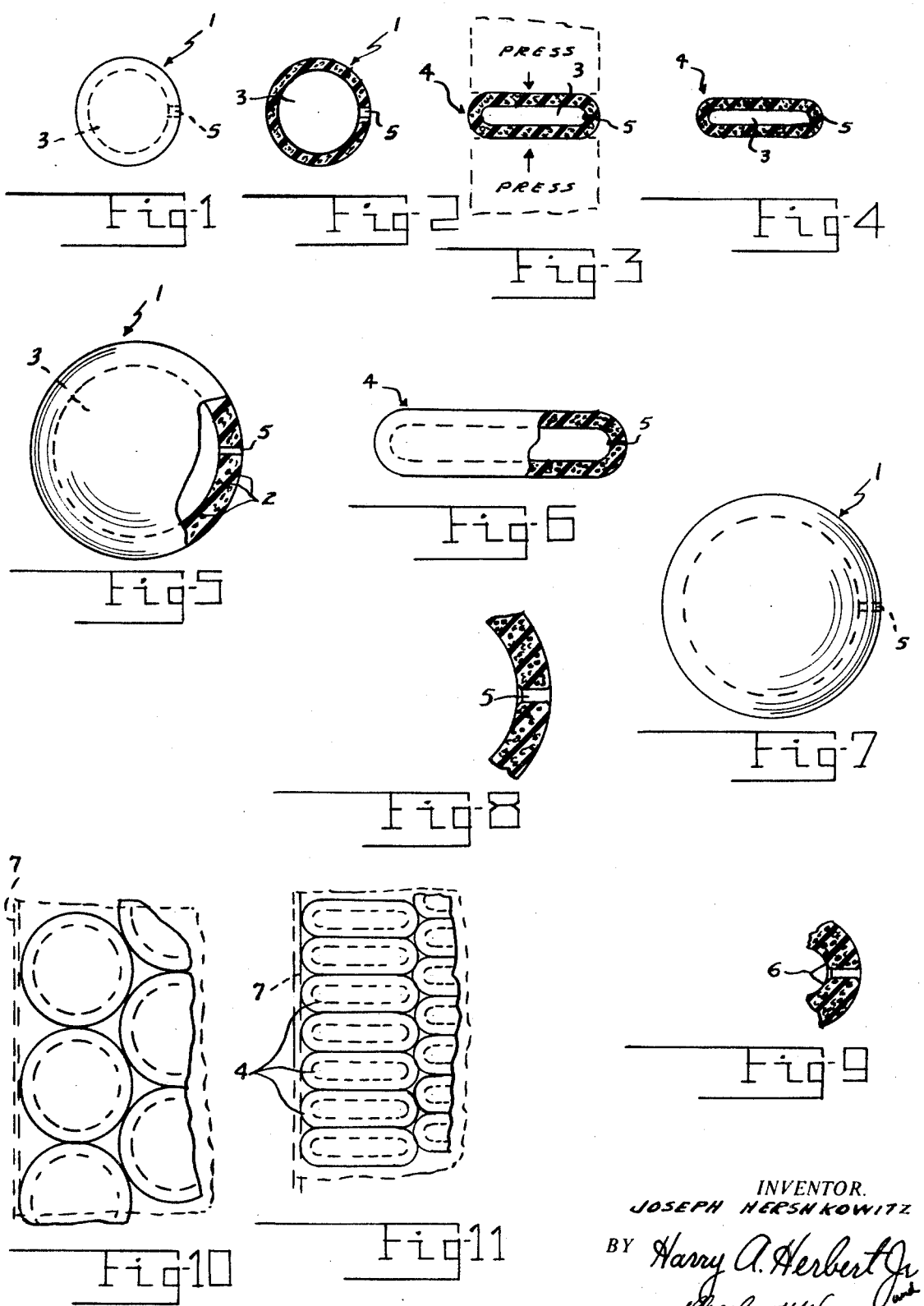

3,749,016

FLEXIBLE HOLLOW SPHERES

BACKGROUND OF THE INVENTION

The lethal value of hollow spheres in penetrating and destroying certain enemy targets is now generally known. Unfriendly satellites, for instance, could be rendered harmless by hollow metallic sphere bombardment rigid in spherical shape and are carried in quantity in warheads, and thus incapable of efficiently utilizing the volume afforded them in their delivery containers.

FIELD OF THE INVENTION

Since the probability of a "kill" is increased by increasing the number or quantity of equally effective hollow spherical projectiles of similar size that can be packed in a predetermined warhead and make available to impact the target, this invention accomplishes the most desirous result and provides an arrangement whereby a greater number of hollow spheres of spherical form with relatively thin walls can be packed in a warhead, and are formed of resilient material such as rubber or a suitable flexible or resilient plastic material which is highly impregnated with metallic particles. The metal impregnated hollow spheres are flattened or compressed so as to occupy less space when packed in a rocket or projectile warhead. Thus, for a given warhead volume considerably more of the resilient metal impregnated flattened spherical projectiles can be packed in the warhead than the previously known hollow "rigid" metallic spherical projectiles or balls. The flattened hollow metal impregnated spheres of the invention each have a predetermined small amount of expansible gas or air trapped and sealed therein which is sufficient to expand the flattened spheres tightly to their spherical shape when projected into and through the rarefied atmosphere of space, or absence of air in the "outer space." The means for maintaining the hollow spheres in their collapsed or flattened condition comprises a small amount of gas or air which is trapped and sealed in the hollow interior of the shells or spheres in their collapsed condition in which the internal gas pressure in the spheres is equal or slightly less than the surrounding atmospheric pressure, for instance at, or substantially at, normal ground level. When the spheres are projected in space toward the target in rarefied air, or in the absence of air, the trapped air within the flattened spheres expand to force the resilient metal impregnated walls of the spheres outwardly into their initial spherical shape, the pressure forces the resilient walls of the spheres outwardly to a comparatively hard, round shape in which the wall material is highly impregnated or mixed with the resilient flexible material to provide a substantially hard metallic thin wall sphere.

An object of the invention is the provision of system optimization of the use of hollow spheres for destroying enemy targets of the type having thin walled, multiple sheet, structures, or laminated ablative structures, as in ballistic missile orbiting vehicles, and more particularly for destroying targets in rarefied atmosphere by hollow resilient spheres which are originally launched in a collapsed state, and have very high velocities, for instance greater than 13,000 fps toward the target, because of the nature of the encounter.

Another object of the invention is the provision of resilient metallic impregnated sphere compositions having a density and geometric efficacious for destroying enemy missiles in space.

A further object of the invention is to increase the number of lethal spheres available in a given volume and thus effecting an increased probability of a "kill" in enemy targets, in which the additional number provided for delivery by a warhead of a given volume compared with rigid true spherical hollow bodies of substantially the same size and weight is accomplished by the collapsing feature of the hollow spheres of this invention to substantially offset the possible individual decrease in efficiency of the resilient collapsed and expansible hollow spheres of the invention when delivered from the warhead against the target.

Other objects and advantages of the invention will become apparent in the following description and accompanying drawings in which like reference characters refer to like parts in the several figures.

BRIEF DESCRIPTION OF THE DRAWING

FIG. 1 is a slightly enlarged view, in elevation, of one of the flexible, resilient, collapsible, hollow spheres incorporating the invention.

FIG. 2 is a transverse sectional view through the center of a sphere, highly impregnated with metallic particles, and showing the small sealable vent hole through the wall to permit a portion of the air or gas therein to escape during the partial compression or flattening thereof.

FIG. 3 is a transverse sectional view illustrating the hollow resilient sphere partially compressed with means, such as a press, for partially collapsing or flattening the opposite sides thereof.

FIG. 4 is a similar view to FIG. 3 but showing the metallic impregnated resilient sphere with the vent sealed and ready for loading in the warhead of the delivery shell or rocket.

FIG. 5 is an enlarged elevational view of one of the spheres and broken away to show the vent or gas escape hole to permit a portion of the air or gas therein to escape during the flattening operation.

FIG. 6 is an enlarged edge view of one of the flattened spheres and partly broken away to show the vent sealed and retained in its flattened condition by the surrounding normal outside atmospheric pressure.

FIG. 7 is a plan view of the flattened sphere shown in FIG. 6.

FIGS. 8 and 9 are fragmentary enlarged views showing one form of vent closure means or plugs which may be used to close the vent after the sphere has been flattened to retain a predetermined amount of gas or air within the sphere after it has been released from the flattened condition.

FIGS. 10 and 11 are comparative fragmental views illustrating the greater number of the flattened spherical projectiles that can be packed in a given space, such as a warhead as compared with the number of the same size but not flattened rigid hollow spherical projectiles that can be closely packed in the same space.

Referring to the drawing, the reference numeral 1 denotes generally one of the flexible hollow spheres or pellets which is made of resilient material such as rubber or highly resilient plastic which is highly impregnated with metallic particles indicated at 2 and molded or otherwise formed in sphere or ball shape with a hollow center 3. The metal particle impregnation of the plastic or rubber wall of the spheres approach a 75 percent or more density. An advantage of the invention is that the resilient rubber or plastic impregnated hollow spheres can be collapsed or flattened during, or before loading or packing into a suitable "warhead" or delivery container, and the relative number of the flattened hollow spheres, as indicated at 4, will be materially greater, as seen in FIG. 11, than the number of rigid hollow metallic spheres of the same diameter (as seen in FIG. 10) that can be packed in a similar container or "warhead."

It is contemplated that the spheres may be made of a rubber-lead composite and having an outside diameter of about one-half inch with a wall thickness of about one thirty-second of an inch, and a sphere weight of about 3.2 grams, if the sphere is to impact and rupture the surface of a target satellite at a relative high velocity of about 13,000 feet per second.

While it is contemplated that the metallic particle impregnated material, or composition, may be rubber or plastic, as each have been found to work satisfactorily, the resilient plastic may be a polyurethane which is reinforced with about 40 to 70 percent by weight of glass fibers having a diameter ranging between 0.01 to 0.05 inches and between 0.1 to 0.5 inches long. When rubber is used it may be natural or synthetic and will be thoroughly and uniformly mixed with a selected metal powder or small metallic particles without regard to any preferred orientation of the metallic powder or particles.

The method of fabrication is not critical and the rubber may be in powder form, pelletized, or in a molten state, etc., when mixed with metal particles or powder. Similarly, the plastic material, if employed, may be powdered, with the glass fibers admixed thereinto, and pelletized or molten. The metal powder may preferably be of a particle size ranging effectively between about 6 to 100 microns, so long as it is generally uniformly distributed throughout the resilient rubber or plastic spherical shell.

While the manufacturing techniques of the spheres or balls constitute no particular part of the invention, almost any standard manufacturing techniques for thin-walled rubber balls may work well.

The resilient highly metal particle impregnated hollow balls or spheres may be compressed or flattened by any suitable means well known in the art, for instance such as shown in dotted lines in FIG. 3. However, it is contemplated that a small volume of air or gas is trapped within the collapsed or flattened spheres at a predetermined low pressure, for instance, between 0.01 and 1.0 psi so that at normal outside atmospheric pressure (of about 14.7 psi) the pressure differential between the low inside gas or air pressure and the greater exterior pressure, as seen in FIGS. 4 and 6 (and 11), will keep the resilient hollow metal impregnated balls or spheres sufficiently flattened until the exterior pressure is eliminated, or substantially eliminated.

One method which may be employed in flattening the pellets is that of withdrawing a predetermined amount of the air or gas from the interior of the pellets through a small vent hole 5 until the pellets collapse or are flattened to the desired thickness, as shown in FIG. 6. Then, close the small vent hole 5, for instance, with a suitable sealing plastic, or plug member 6.

Another method that may be employed is to press the opposite sides of the spheres 1 toward each other to displace the desired amount of the air or gas in the spheres, and then plug or seal the small vent hole or opening 5 with a suitable sealing medium or plug 6.

The flattened pellets 4, as shown in FIG. 11, may be packed or nested in a suitable warhead, shell or delivery container 7. When released in atmospheric pressure the pressure differential between the interior and exterior pressures maintains the pellets or balls in the desired initial flattened or collapsed condition, as seen in FIG. 6.

By reference to FIG. 10, it will be seen that a much greater quantity of the flattened (expandable) resilient pellets 1 can be packed in a shell or delivery "warhead" such as 7 than when rigid hollow spheres are packed in a similar warhead area. When suitably loaded into the warhead or delivery container, such as disclosed at 7, a slight further pressure may be applied to obtain the same state of collapse of the metalized pellets as when the tiny holes 5 are sealed, with the opposite sides of the spheres under the flattened pressure.

When the flattened pellets are released in a rarefied atmosphere or in the absence of exterior pressure, the trapped air or gas therein will expand the flattened pellets or spheres to their original intended spherical shape and the interior trapped expanding pressure on the interior walls of the spheres may be sufficient under the circumstances to fairly firmly support the wall of the metalized resilient sphere upon the impact of the spheres or pellets against the wall or surface of a satellite or other target in outer space.

Small hollow metal spheres, upon impact with a thin skin target in space, when projected at high velocities around and above 13,000 fps have been found to produce considerable damage, especially when delivered from a warhead in quantities. While it appears that the resilient rubber hollow metallic particle impregnated spheres of the subject invention may be slightly lighter in weight than the rigid hollow all metal wall pellets that are known in the art, it is apparent that the greater number of the flattened highly metallic impregnated pellets or balls which can be carried by a similar warhead, when released and expanded by the air or gas trapped therein, will do as much or more damage to a similar target surface, or enemy satellite, in space than the smaller number of rigid non-collapsible spheres or pellets which can be carried in the space afforded in the same delivery vehicle.

The small resilient collapsed spheres or pellets of the subject invention, when delivered in quantity at high velocities as previously indicated, should be particularly useful in outer space against orbiting space vehicles or satellites and missile boosters having thin hulled, multiple sheet or laminated ablative structure, particularly those having outer aluminum meteor bumpers of about one-eighth inch thick, backed up with aluminum skin about one-half inch in thickness.

For purposes of exemplification, a particular embodiment of the invention has been shown and described to the best understanding thereof. However, it will be apparent that slight changes and modifications in the construction and arrangement of the parts thereof may be resorted to without departing from the true spirit and scope of the invention as defined in the accompanying claims.

I claim:

1. Resilient hollow spherical projectiles for use against relatively thin walled missiles, satellites and targets in relatively rarefied atmosphere of outer space at high projected velocities, each comprising a flattened initially spherical resilient compressible hollow body having a highly metallic particle impregnated annular wall, and a compressible — expansible gaseous fluid medium trapped and sealed therein at a materially lower pressure below normal outer surrounding ground level atmospheric pressure, for expansion thereof within said flattened hollow body, upon a material reduction in or lack of outside atmospheric pressure surrounding said resilient hollow body, to pressurize the wall of said flattened initially spherical resilient compressible hollow body outwardly to said initial spherical shape.

2. A resilient hollow spherical body projectile as set forth in claim 1, in which said compressible gaseous medium is trapped and sealed in said hollow body, and said body comprises a resilient rubber-like annular spherical wall highly and closely impregnated throughout with very small metal particles.

3. A resilient hollow spherical body as set forth in claim 2 in which the opposite sides of said resilient spherical hollow body are flattened toward each other with said gaseous pressure fluid medium trapped and sealed therein at a low pressure less than 2 psi at normal outside atmospheric pressure surrounding the body of about 14.7 psi.

4. A resilient hollow spherical projectile body as set forth in claim 3 in which the wall thereof is initially spherical and is flattened to afford a material saving of space, so that a greater number of said flattened resilient spherical projectiles can be packed in a projected warhead of predetermined size than similar rigid metal spherical projectiles of identical diameter, to afford a greater degree of impact when projected from the warhead in quantity toward a selected target in space.

5. Small hollow resilient rubber-like initially spherical projectiles for packing in quantity in flattened condition in a "warhead" for projection at high velocity toward a selected thin-wall target in outer space as set forth in claim 4, each projectile comprising a subsequently partially flattened hollow spherical body having a highly metal particle impregnated spherical outer wall having a predetermined amount of air trapped and sealed therein at less than 2 psi for retaining said wall of said body in partially collapsed and flattened condition while packed in the warhead at surrounding outside atmospheric pressures materially greater than the pressure of the trapped air within said body, whereby when said flattened spherical bodies are projected from said "warhead" in outer space where the outside surrounding pressure is absent or materially less than the pressure of said inside trapped air, the pressure differential of said internal pressure in said initially spherical projectile on the wall of the flattened body will pressurize and expand said wall outwardly to the initial spherical shape, for impact with the target.

6. A flexible resilient hollow sphere as set forth in claim 5 having an initial spherical shape, composed of a rubber-like lead composite with an outside diameter of approximately one-half inch and a wall thickness of approximately one thirty-second of an inch.

7. A flexible hollow sphere as set forth in claim 6 reinforced throughout with about 40 to 70 weight percent of glass fibers having a diameter ranging between 0.01 to 0.05 inches and about 0.1 to 0.5 inches long.

8. A partially flattened resilient hollow initially spherical projectile as set forth in claim 1 in which the highly metallic impregnated annular wall thereof comprises resilient rubber like material thoroughly impregnated with metal powder having a particle size between 6 to 100 microns uniformly distributed throughout the resilient rubber-like material.

9. A hollow spherical projectile as claimed in claim 8 in which the metallic powder impregnated wall is reinforced throughout with glass fibers and the gaseous pressure medium trapped and sealed within the sphere is between 0.01 to 1 psi, having sufficient volume to expand the collapsed wall of the sphere to its initial spherical shape almost immediately upon ejection in rarefied atmospheres.

10. In combination with a projectile delivery container, a plurality of partially collapsed and flattened hollow resilient rubber-like spherical projectiles packed and stacked in, and filling said delivery container, each of said projectiles having a highly and thoroughly fine metal particle impregnated rubber-like initially spherical wall, a gaseous pressure medium trapped and sealed therein at a pressure less than 2 psi, for expansion thereof upon predetermined reduction or lack of exterior pressure surrounding the exterior of said flattened spherical projectiles, for expanding the wall of said flattened rubber-like spherical projectile substantially to said initial spherical shape thereof, when the same is projected from said projectile delivery container toward a selected target through said predetermined reduction in or lack of exterior surrounding atmospheric pressure.

* * * * *